United States Patent
Maggard et al.

(10) Patent No.: US 9,661,935 B2
(45) Date of Patent: May 30, 2017

(54) CUSHION RESTORATION METHOD

(71) Applicants: Belinda A. Maggard, Paintsville, KY (US); James S. Maggard, Paintsville, KY (US)

(72) Inventors: Belinda A. Maggard, Paintsville, KY (US); James S. Maggard, Paintsville, KY (US)

(*) Notice: Subject to any disclaimer, the term of this patent is extended or adjusted under 35 U.S.C. 154(b) by 207 days.

(21) Appl. No.: 14/800,132

(22) Filed: Jul. 15, 2015

(65) Prior Publication Data
US 2016/0296032 A1    Oct. 13, 2016

Related U.S. Application Data

(60) Provisional application No. 62/145,349, filed on Apr. 9, 2015.

(51) Int. Cl.
| | |
|---|---|
| A47C 27/16 | (2006.01) |
| B23P 6/00 | (2006.01) |
| A47C 27/12 | (2006.01) |
| A47C 27/20 | (2006.01) |
| B68G 7/12 | (2006.01) |

(Continued)

(52) U.S. Cl.
CPC ........... *A47C 27/16* (2013.01); *A47C 7/20* (2013.01); *A47C 27/127* (2013.01); *B23P 6/00* (2013.01); *A47C 7/185* (2013.01); *B68G 7/12* (2013.01); *Y10T 29/48* (2015.01); *Y10T 29/481* (2015.01); *Y10T 29/49718* (2015.01)

(58) Field of Classification Search
CPC . Y10T 29/48; Y10T 29/481; Y10T 29/49718; Y10T 29/49721–29/49725; Y10T 29/49732; Y10T 29/49748; B23P 6/00; A47C 7/185; A47C 7/20; A47C 17/86; B68G 7/02; B68G 7/05; B68G 7/052; B68G 7/054; B68G 7/06; B68G 7/12
USPC .......................... 297/452.55, 452.56, 452.57
See application file for complete search history.

(56) References Cited

U.S. PATENT DOCUMENTS

| | | | | |
|---|---|---|---|---|
| 3,310,613 | A * | 3/1967 | Lundberg | A47C 5/125 156/145 |
| 3,751,742 | A * | 8/1973 | Worley | A47C 19/027 5/659 |

(Continued)

*Primary Examiner* — Christopher Besler
*Assistant Examiner* — Matthew P Travers
(74) *Attorney, Agent, or Firm* — ATLawip LLC; Jeffrey T. Breloski

(57) ABSTRACT

Steps for using an insert to restore sagging sofa cushions are provided. Over time, the cushion develops a depression on a sitting surface of a deformable member and an elevation on a base surface of the deformable member. The cushion also suffers from reduced elasticity in the deformable member. Positioning the insert between a cushion casing and deformable member of the cushion allows for sagging areas of the cushion to be fixed. The cushion restoring insert thus addresses both aforementioned issues. An elongated elastic member with similar elasticity to the original cushion provides a like-new level of elasticity for the cushion. The cushion restoring insert also increases volume within the cushion casing, causing tension in combination with the cushion casing. This tension counteracts the depression and elevation, helping to return the cushion to a like new state.

10 Claims, 11 Drawing Sheets

(51) Int. Cl.
    *A47C 7/18*    (2006.01)
    *A47C 7/20*    (2006.01)

(56) References Cited

U.S. PATENT DOCUMENTS

| | | | | |
|---|---|---|---|---|
| 5,048,167 A | * | 9/1991 | Heffley | A47C 27/063 |
| | | | | 29/402.03 |
| 6,871,369 B1 | * | 3/2005 | Long | A47C 21/06 |
| | | | | 5/655.9 |
| 8,651,579 B2 | * | 2/2014 | Pettingill | A47C 23/06 |
| | | | | 297/452.49 |
| 2006/0117486 A1 | * | 6/2006 | Clark | A47C 21/06 |
| | | | | 5/659 |
| 2007/0000060 A1 | * | 1/2007 | Firestone | A47C 27/081 |
| | | | | 5/659 |
| 2008/0284231 A1 | * | 11/2008 | Takei | A47C 7/022 |
| | | | | 297/452.48 |

* cited by examiner

CUSHION RESTORATION METHOD

The current application claims a priority to the U.S. Provisional Patent application Ser. No. 62/145,349 filed on April 9, 2015.

FIELD OF THE INVENTION

The present invention relates generally to an approach for restoring the condition of a cushion by placing an insert within a casing of said insert in order to level out the exterior surfaces of said cushion.

BACKGROUND OF THE INVENTION

Sofa cushions aren't made to last forever. When in use the sofa cushion becomes compressed and overtime this constant compressive force causes the cushion to undergo a foam deformation and which in turn cause the sofa cushion to become less elastic, flattened, and compressed. In addition, this causes the sofa cushion to lose its form and it is usually left with an indentation that causes the sofa cushion to appear concave and deflated which is not appealing to most consumers. The present invention combats this issue by providing a solution to restore sofa cushions to near their original condition by providing the old and deformed sofa cushion to a firmer and restored shape, making it easier to get up from your seat.

It is therefore an object of the present invention to provide consumers an alternative to purchasing new sofas or custom made sofa cushions, both of which can be expensive. It is a further object of the present invention to restore the aesthetic appearance and functionality of a sofa cushion by improving the elasticity of the sofa cushion via retrofit. Additional objects of the present invention include supplementing cushion foam in order to increase density and firmness of the cushion, bridging a spring-containing area of a cushion in order to increase firmness, providing lift to the cushion in order to make standing up from the cushion easier, and providing restored seating comfort. While primarily described as being used in combination with sofa cushions, the present invention can be used to restore any type of cushion.

DETAIL DESCRIPTIONS OF THE INVENTION

All illustrations of the drawings are for the purpose of describing selected versions of the present invention and are not intended to limit the scope of the present invention.

Figure 1:
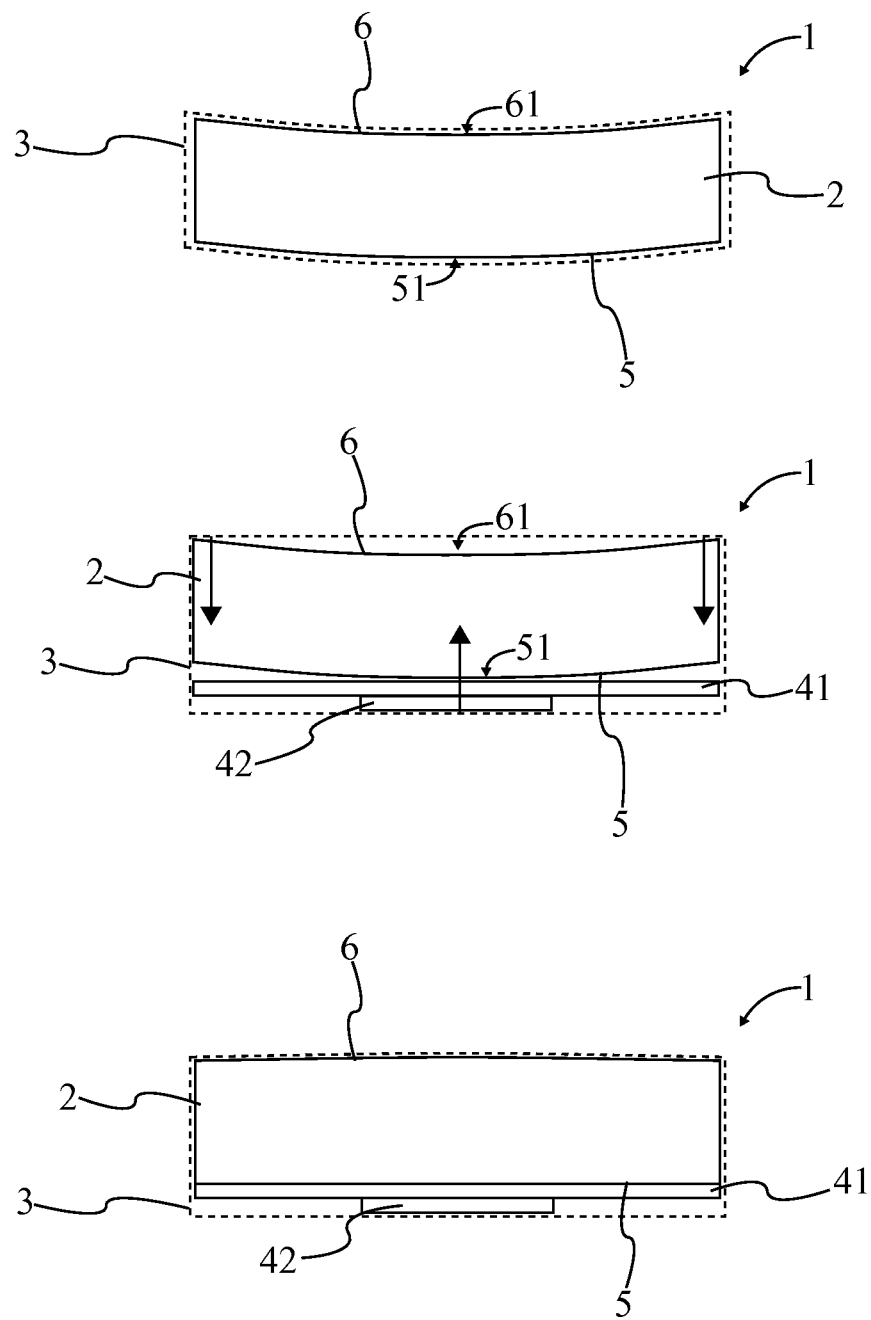
FIG. 1 is a graphical depiction of the process of the present invention.
Figure 2:
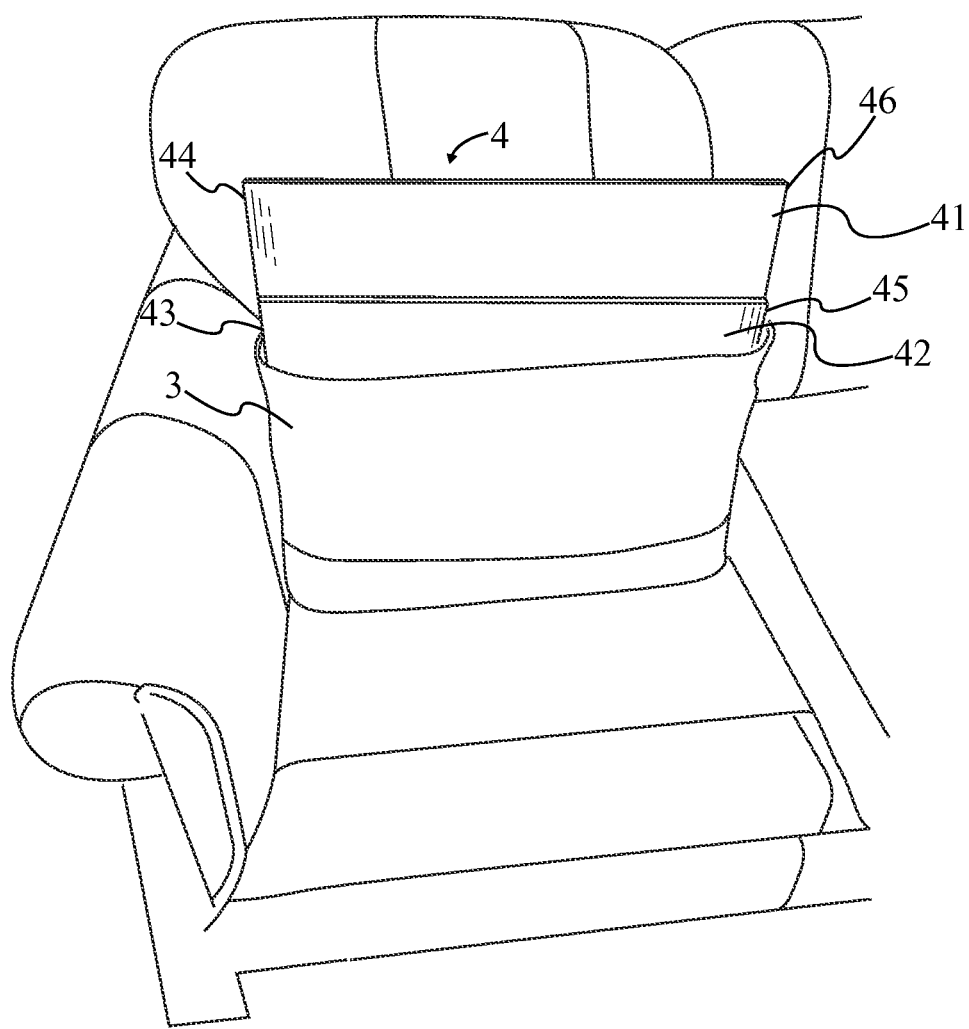
FIG. 2 is an illustration showing a cushion restoring insert placed into a cushion casing per the process of the present invention.
Figure 3:
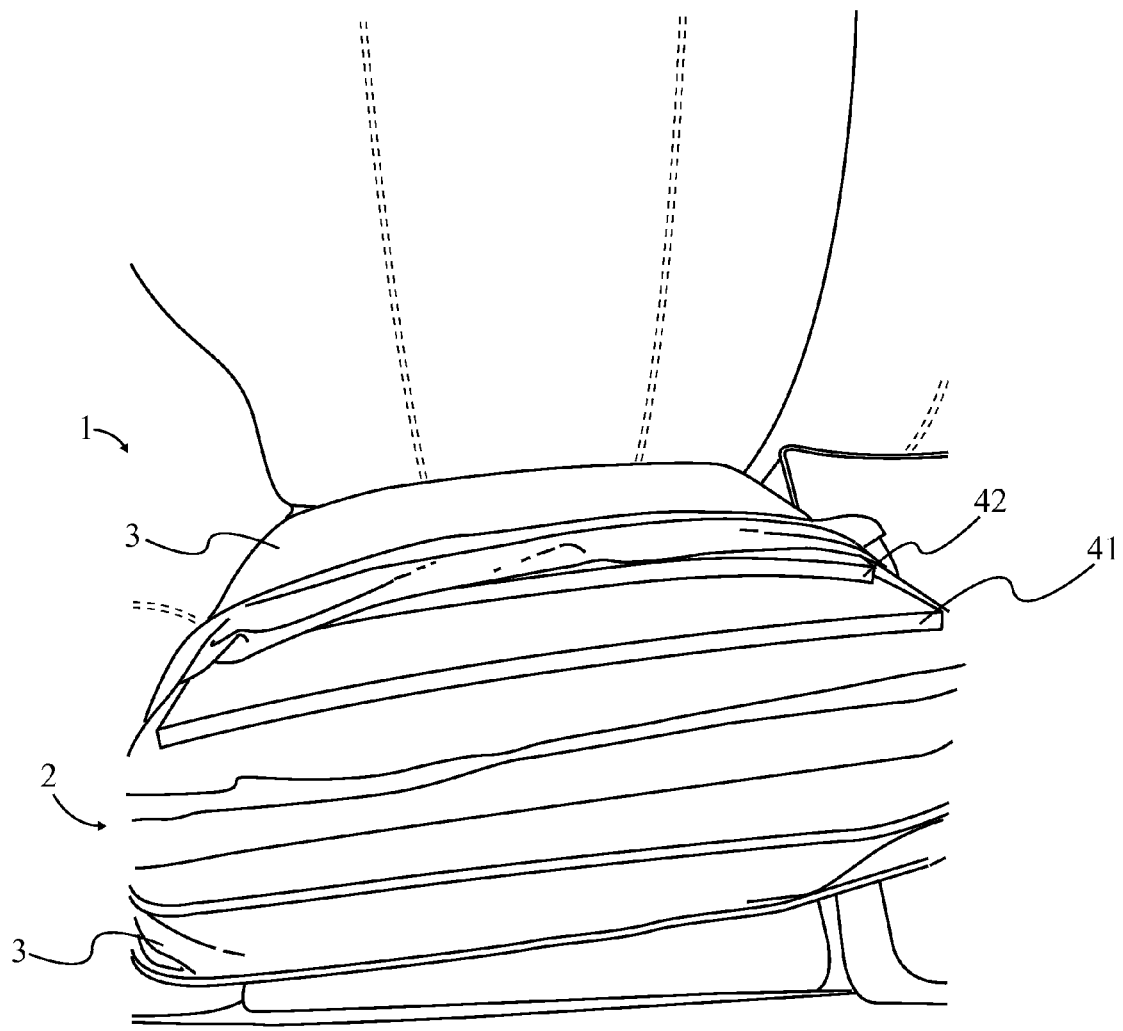
FIG. 3 is another illustration showing the cushion restoring insert next to a deformable member per the process of the present invention.
Figure 4:
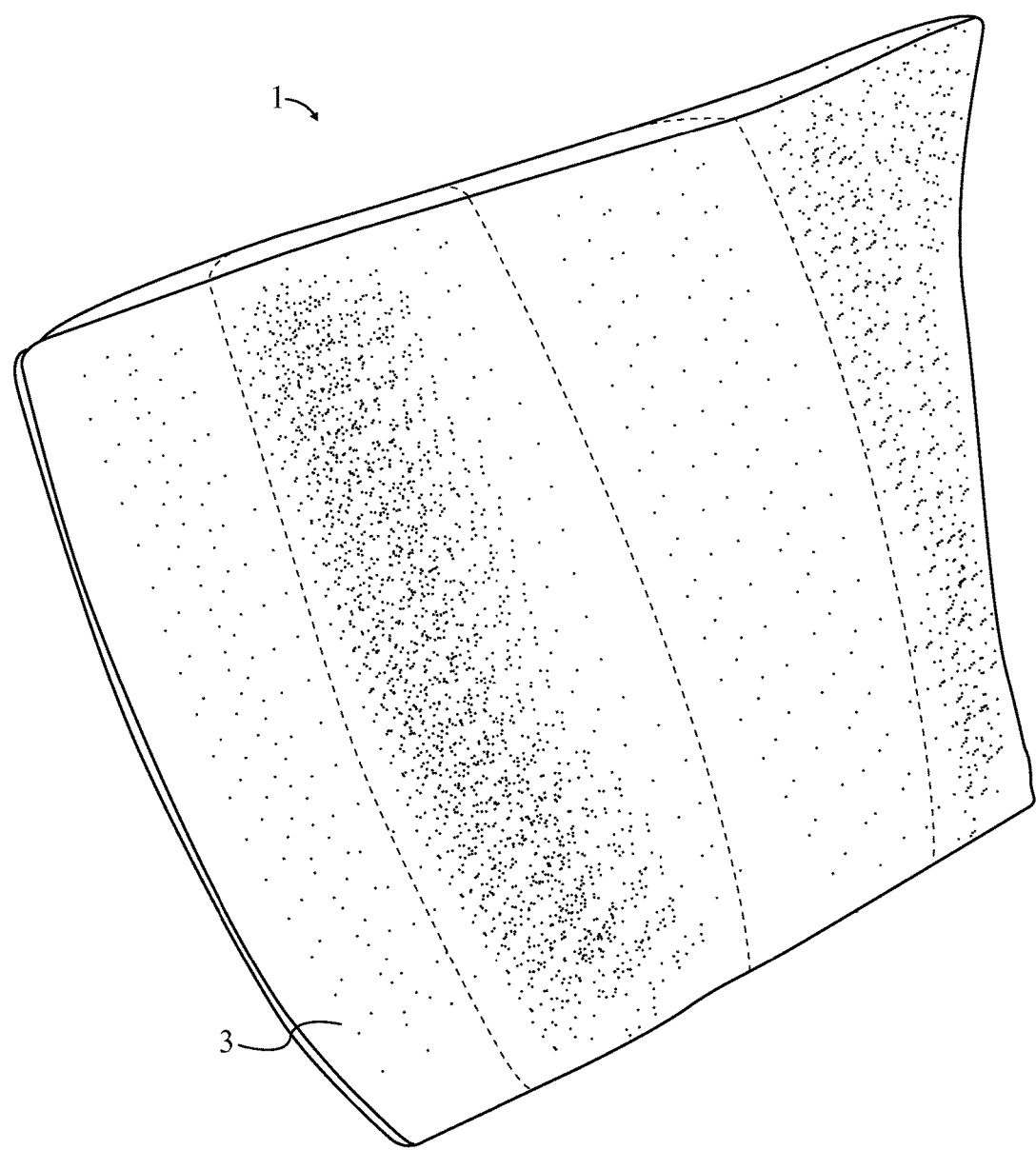
FIG. 4 is an illustration showing the impression of the cushion restoring insert positioned on the bottom of a cushion.
Figure 5:
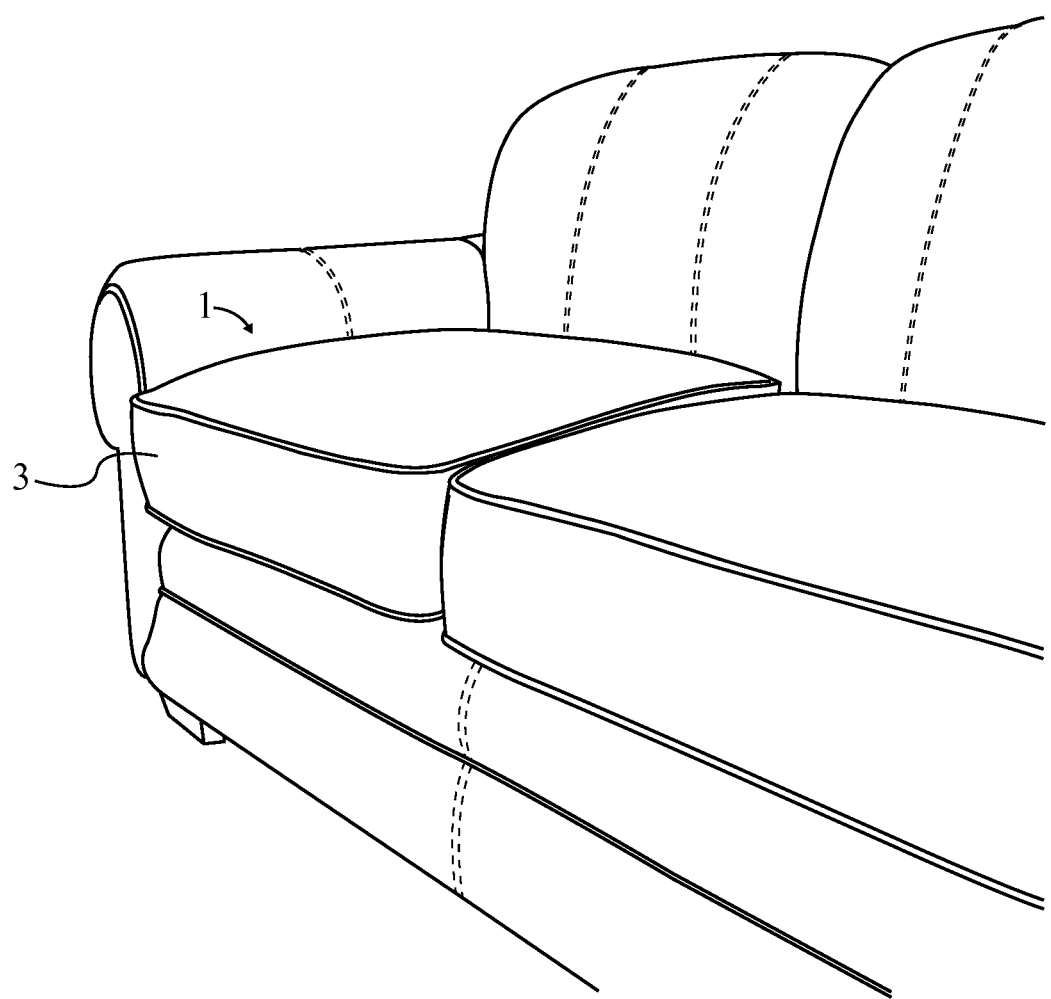
FIG. 5 is a comparison showing a left cushion restored via the present invention and a right cushion which has not been restored via the present invention.
Figure 6:
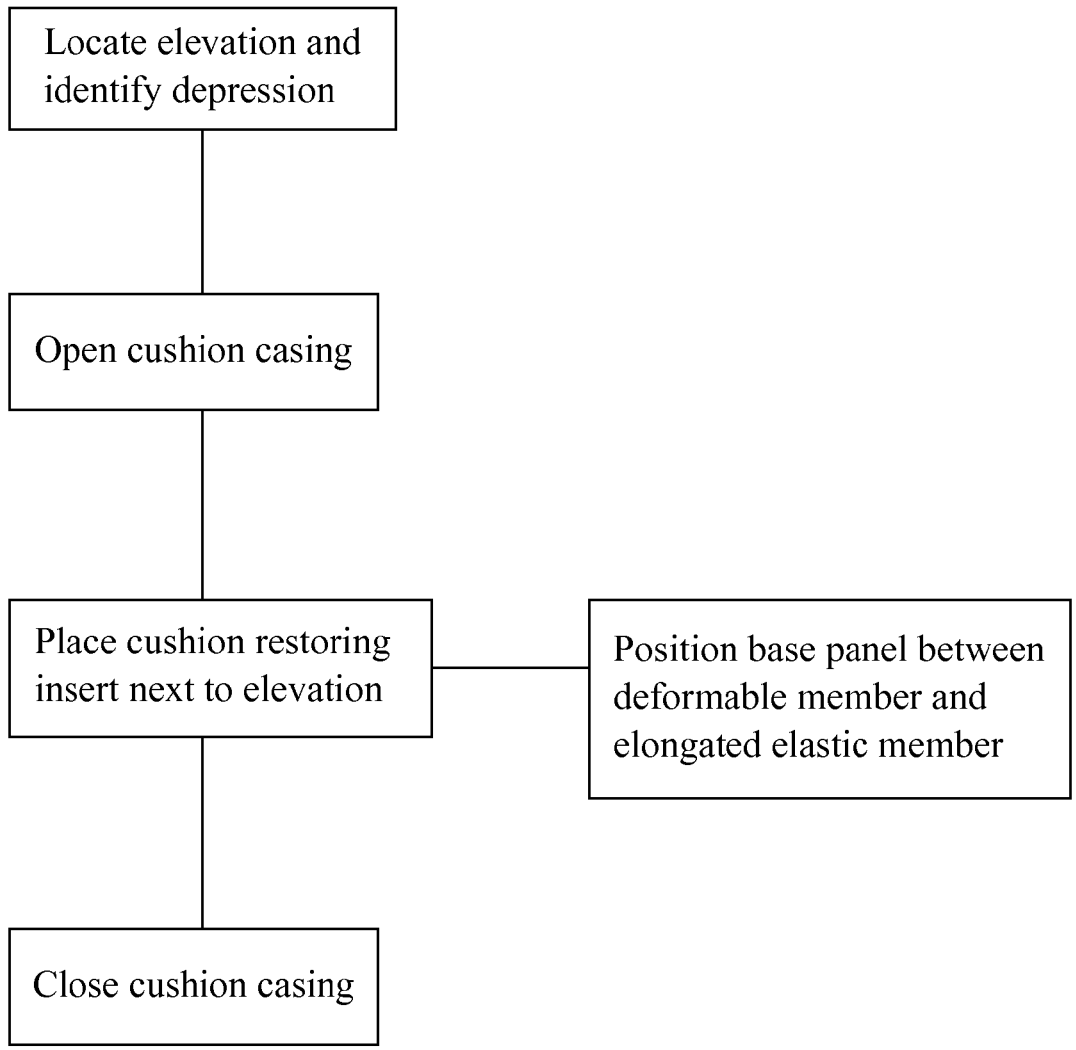
FIG. 6 is a flow chart outlining the process of the present invention.
Figure 7:
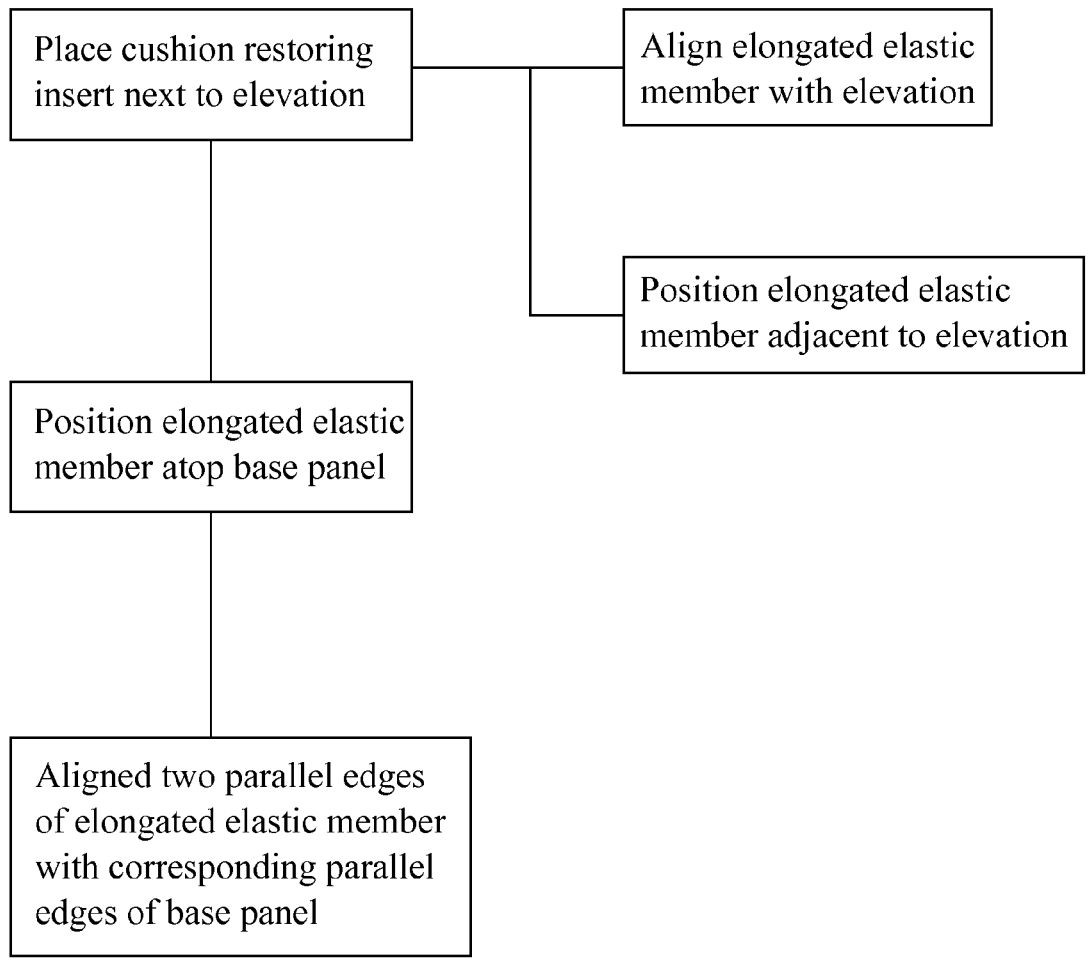
FIG. 7 is a flow chart outlining placement of the cushion restoring insert.
Figure 8:
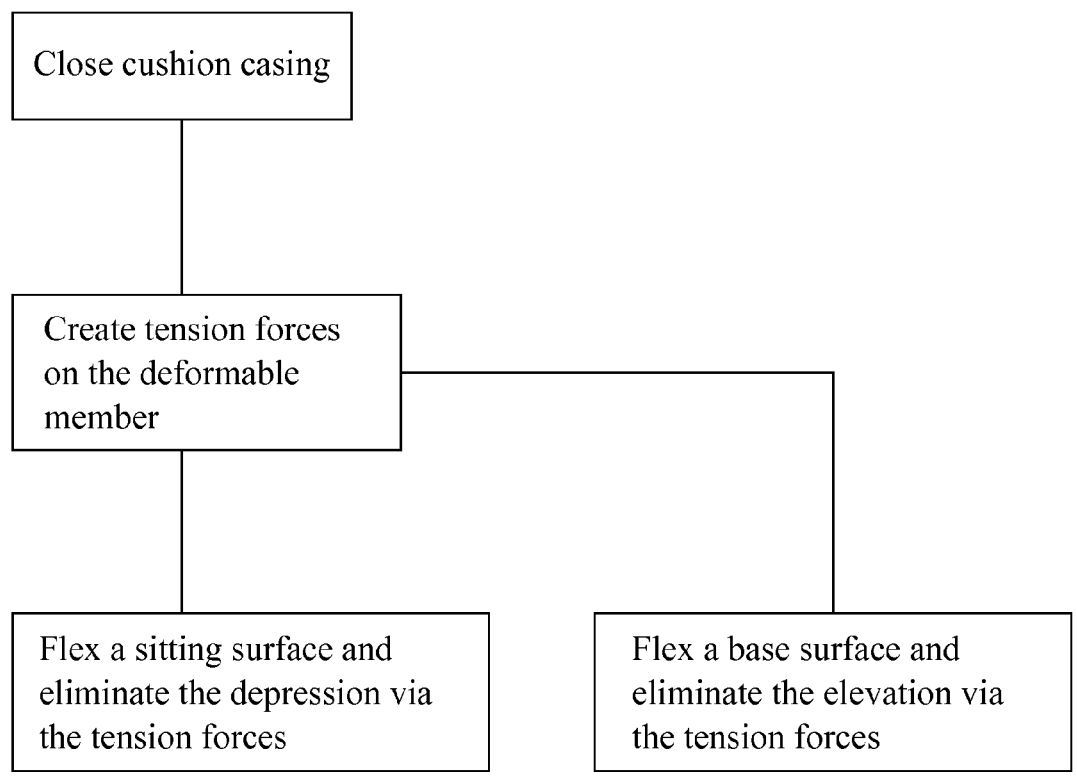
FIG. 8 is a flow chart outlining the use of tension forces to flex and restore a cushion per the process of the present invention.

The present invention is a method provided for the restoration of sofa cushions which are sagging, as often occurs with prolonged use. The method of the present invention utilizes an insert which can be positioned within an existing cushion 1 (sofa or otherwise) to eliminate a sag, resulting in the cushion's 1 top surface returning to its original slightly convex shape. The method of the present invention is applicable to any deformable member 2 enclosed within a cushion casing 3, examples including but not being limited to sofa cushions and chair cushions. At a general level, the present invention restores a cushion 1 by installing an insert that corrects for sagging and restores an element of elasticity and comfort to said cushion 1 thanks to material properties that mirror those of the cushion 1. The process of the present invention is illustrated in FIG. 1. The present invention is further visualized in FIG. 2-FIG. 5, while the process of the present invention is outlined in FIG. 6-FIG. 8.

Figure 9:
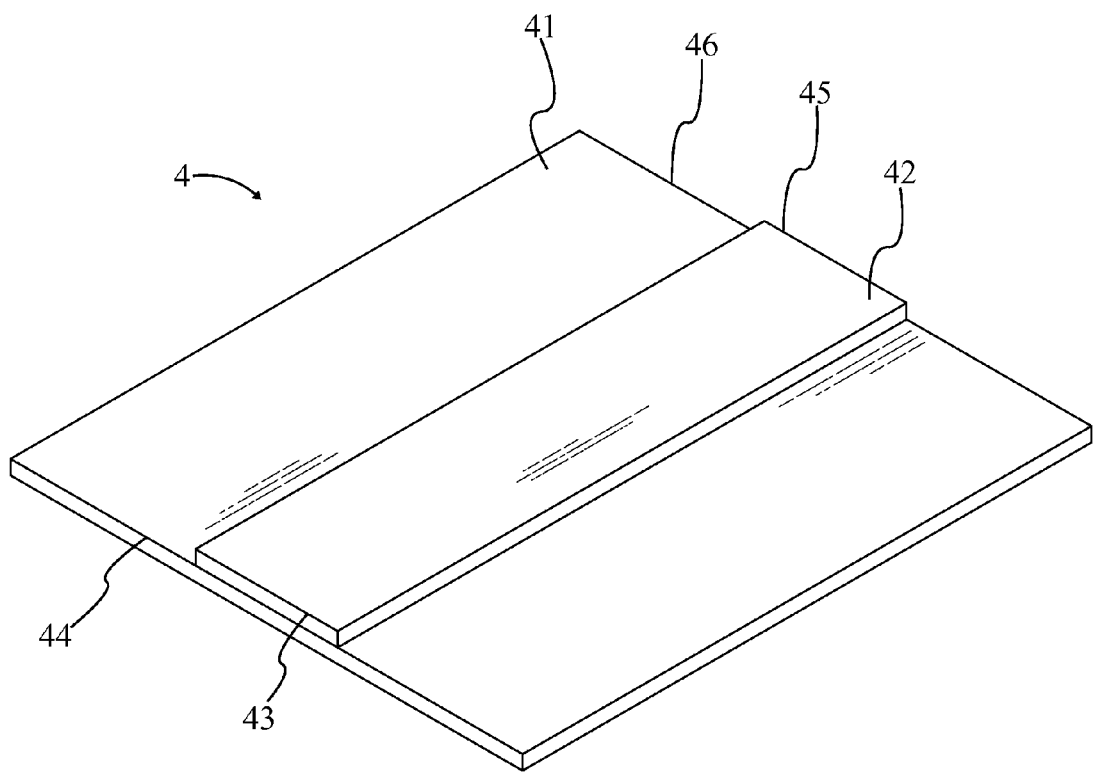
FIG. 9 is a perspective view showing the cushion restoring insert utilized with the present invention.
Figure 10:
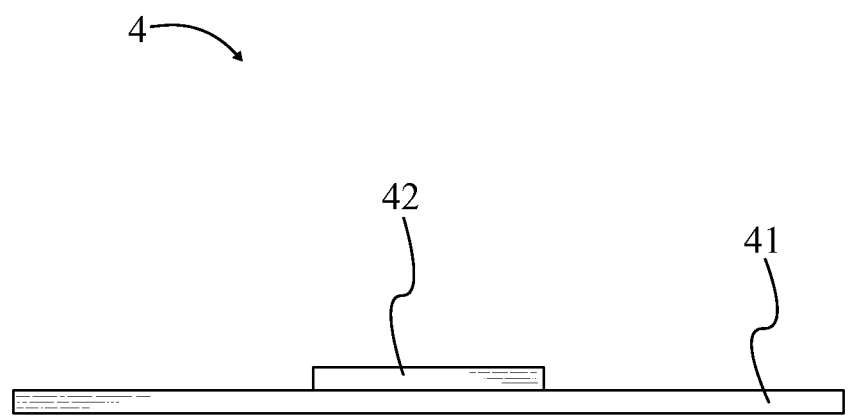
FIG. 10 is a front elevational view showing the cushion restoring insert utilized with the present invention.
Figure 11:
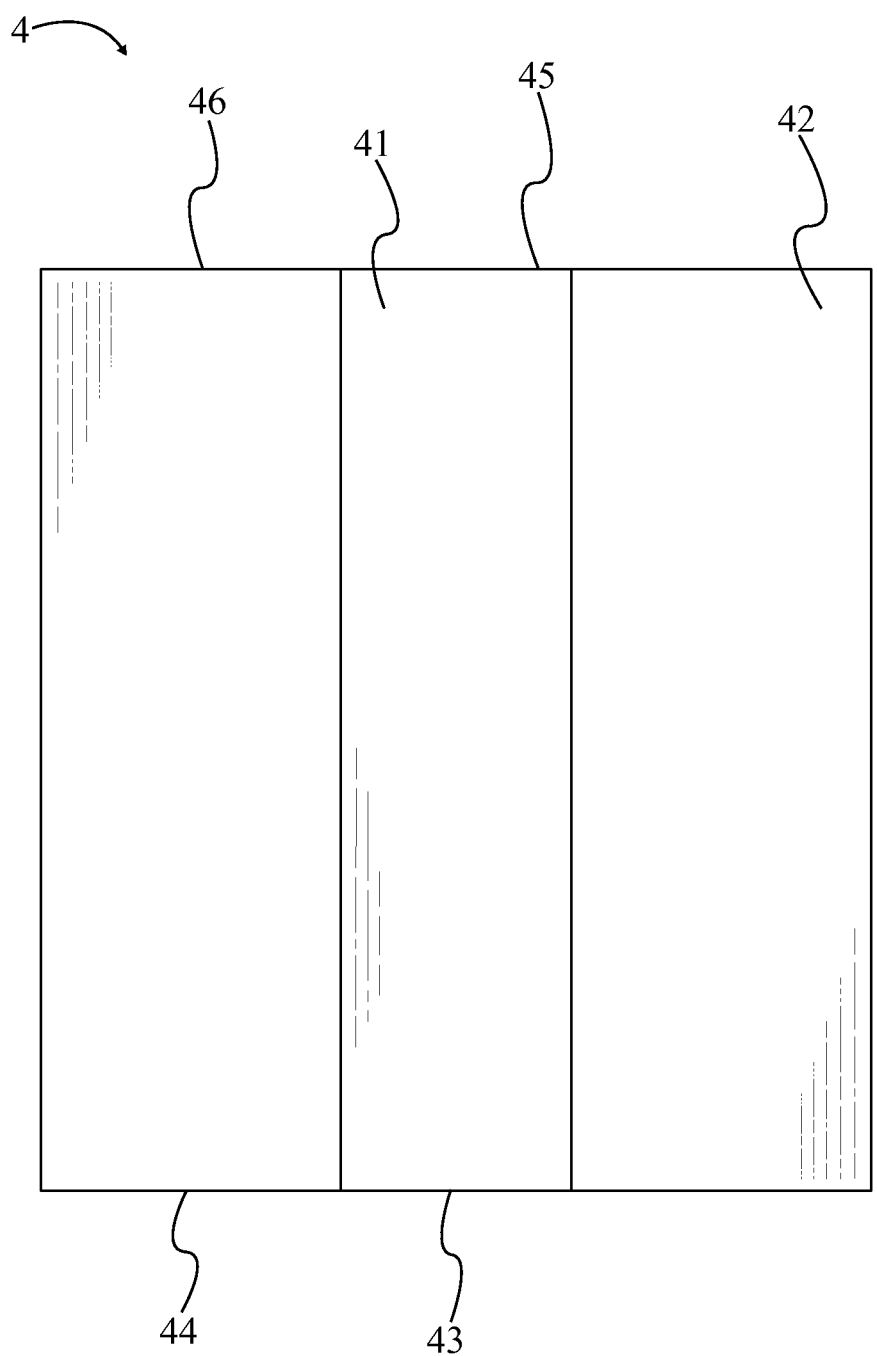
FIG. 11 is a top plan view showing the cushion restoring insert utilized with the present invention.

The method of the present invention is utilized with a cushion 1, with installation of a cushion restoring insert 4 returning the cushion 1 to a like-new state. The cushion restoring insert 4 is individually shown in FIG. 9-FIG. 11. The cushion 1 is defined as a deformable member 2 (e.g. the soft interior that provides support for a person's posterior) and a cushion casing 3 (e.g. the covering that keeps said soft interior clean). The cushion restoring insert 4 comprises a base panel 41 and an elongated elastic member 42. The elongated elastic member 42 (which can also be referred to as a "posture zone") compresses in response to an applied force (e.g. when a person sits on the cushion 1), effectively supplementing the elasticity of the deformable member 2. The elongated elastic member 42 additionally increases the height of a sagging area in relation to the other portions of the cushion 1, helping to restore the cushion 1 to an original rounded shape. The interaction of the cushion restoring insert 4 and the cushion 1 thus results in deformations of the cushion 1 being eliminated. Benefits of said interaction include giving the sofa cushion 1 greater thickness (i.e. the distance between the top and bottom of the cushion 1) as well as an aesthetically appealing elliptical shape, the latter as compared to the deflated irregular shapes encountered in older used cushions 1.

The method of the present invention begins with determining a portion of the cushion 1 that is sagging. The sagging area creates an elevation 51 (a convex region) on the base surface 5 of the deformable member 2, and a corresponding depression 61 (a concave region) on the sitting surface 6 of the deformable member 2. The cushion restoring insert 4 must be aligned with the sagging area in order to correctly flex the cushion 1 and return it to a like-new state.

Once the sagging area has been identified, the cushion casing 3 must be opened in order to provide access to the deformable member 2 housed within the cushion casing 3. Most commonly, this is achieved by pulling a zipper head in order to unzip the cushion casing 3, though the exact means depends on the individual cushion casing 3; though zippers are ubiquitous, other means of opening and closing the cushion casing 3 are possible.

After opening the cushion casing 3 the cushion restoring insert 4 is placed within the cushion casing 3, adjacent to the deformable member 2. The cushion restoring insert 4, as earlier referenced, is aligned with the sagging area such that the cushion restoring insert 4 neutralizes the sagging area. This restorative process is completed by closing the cushion casing 3 about the deformable member 2 and adjacent cushion restoring insert 4. As the cushion restoring insert 4 increases the volume within the cushion casing 3, tension is created that compresses the cushion restoring insert 4 (specifically the elongated elastic member 42) and applies a force upon the deformable member 2 that results in the deformable member 2 flexing.

By following the general process outlined above, the cushion 1 is returned to a like-new state. Application of the present invention with the cushion restoring insert 4 negates the need for new cushions 1 or other costly measures which might otherwise have to be taken to address sagging cushions 1. Steps of the above method are subsequently described in more detail. The restoration of a cushion 1 is shown in FIG. 1, along with the tension forces created by closing the cushion casing 3.

The process of positioning the cushion restoring insert 4 within the cushion casing 3 calls for aligning the elongated elastic member 42 with the elevation 51 and positioning the elongated elastic member 42 adjacent to said elevation 51. Placing the elongated elastic member 42 adjacent to the elevation 51 allows for the two pieces to contact each other, such that the elongated elastic member 42 will support the elevation 51 within the sofa cushion 1 (the elongated elastic member 42 is below the elevation 51). It is noted that this positioning results in the cushion restoring insert 4 being positioned in the bottom of the cushion casing 3, i.e. the cushion restoring insert 4 will be on the side of the cushion casing 3 that faces downwards. Also noteworthy, though persons most commonly sit on the center of a cushion 1, resulting in the sagging area being centered, this is not always the case. Thus, while the elongated elastic member 42 will most commonly be centered with respect to the deformable member 2, it may also be aligned with one of the sides of the cushion 1 (depending on position of the sagging area).

The elongated elastic member 42 itself is positioned atop the base panel 41, such that the elongated elastic member 42 is positioned between the elevation 51 and the base panel 41. Since the base panel 41 supports both the elongated elastic member 42 as well as the original deformable member 2, it is positioned below the base panel 41. To provide the best support for the elongated elastic member 42, a first edge 43 of the elongated elastic member 42 is aligned with a corresponding first edge 44 of the base panel 41. Likewise, an opposite edge 45 of the elongated elastic member 42 is aligned with a corresponding opposite edge 46 of the base panel 41.

Once the cushion restoring insert 4 has been properly positioned within the cushion casing 3, the cushion casing 3 is closed. As the cushion restoring insert 4 increases the volume of material within the cushion casing 3, closing of the cushion casing 3 results in tension forces being applied to several areas of the deformable member 2. The tension presses down around a perimeter 62 of a sitting surface 6 of the deformable member 2. Simultaneously, the tension presses up against the cushion restoring insert 4 and transitively the base surface 5 of the deformable member 2.

As the tension creates a net positive force on the elevation 51 and a net negative force on the perimeter 62 of the sitting surface 6 (i.e. the area surrounding the depression 61), the deformable member 2 flexes such that the sitting surface 6 and the base surface 5 are flexed by the tension. Simply put, by pressing down around the perimeter 62 of the sitting surface 6 of the deformable member 2, the sagging area can be neutralized.

Preferably, the base panel 41 is elastic, as is the elongated elastic member 42. Preferably, the elasticity of the base panel 41 and elongated elastic member 42 matches that of the cushion 1 which is being restored; this helps better simulate the feel and appearance of new cushion 1, one without sagging.

The cushion restoring insert 4 can be provided as a unitary body (e.g. with the base panel 41 and elongated elastic member 42 connected to each other) or as two separate bodies, with the base panel 41 and elongated elastic member 42 being temporarily attached to each other (e.g. via hook-and-loop fastener) or even merely held adjacent to each other through tension of the cushion casing 3. Embodiments which are not permanently connected allow a user to readjust the position of the elongated elastic member 42 with respect to the base panel 41. This ultimately provides more flexibility as the elongated elastic member 42 can be better positioned to neutralize a sagging area in a cushion 1 (e.g. where the sagging is most prominent), as the sagging area can vary between individual cushions 1. Visual representations of one embodiment of the cushion restoring insert 4 are provided through FIG. 9-FIG. 11.

The cushion restoring insert 4 can be packaged and sold individually or in multiples (e.g. a package of two or a package of three). Making the cushion restoring insert 4 available in packages of two or three is ideal as many sofas have either two cushions 1 or three cushions 1. Given that more that sagging is likely to occur in all the cushions 1 of a sofa, rather than being isolated to a single cushion 1, packages of two or three cushion restoring inserts 4 are more consumer friendly in that they provide cushion restoring inserts 4 for each cushion 1 of the most common sofa.

Different embodiments of the cushion restoring insert 4 may utilize different materials in their construction. In a preferred embodiment the cross linked polyethylene foam is used for the cushion restoring insert 4, as said foam mimics the functionality of a brand new sofa cushion 1.

In addition to material differences, dimensions of the cushion restoring insert 4 may be altered to provide a better fit with different cushions 1. For example, in one embodiment the base panel 41 may be provided with a length of 18" and width of 20". These dimensions are allow the cushion restoring insert 4 to be utilized with standard sized sofa cushions 1. In another embodiment, to better fit larger sofa cushions 1, the base panel 41 may instead be provided with a length of 20" and width of 27". These are just a few example dimensions for the base panel 41, with other widths and lengths being possible in other embodiments of the cushion restoring insert 4.

Although the invention has been explained in relation to its preferred embodiment, it is to be understood that many other possible modifications and variations can be made without departing from the spirit and scope of the invention as hereinafter claimed.

What is claimed is:

1. A cushion restoration method comprising the steps of:
providing a cushion, wherein the cushion comprises a deformable member enclosed by a cushion casing;
providing a cushion restoring insert, wherein the cushion restoring insert comprises a base panel and an elongated elastic member;
locating an elevation on a base surface of the deformable member by identifying a depression on a sitting surface of the deformable member, wherein the base surface and the sitting surface are opposite surfaces of the deformable member;
opening the cushion casing in order to access the deformable member;
placing the cushion restoring insert within the cushion casing adjacent to the deformable member;
positioning the elongated elastic member between the base panel and the base surface; and
closing the cushion casing in order to create tension in the cushion casing, wherein the tension neutralizes the depression and the elevation.

2. The cushion restoration method as claimed in claim 1 comprising the step of:
aligning the elongated elastic member with the elevation.

3. The cushion restoration method as claimed in claim 1 comprising the step of:
positioning the elongated elastic member adjacent to the elevation.

4. The cushion restoration method as claimed in claim 1 comprising the steps of:
positioning the elongated elastic member atop the base panel;
aligning a first edge of the elongated elastic member with a corresponding first edge of the base panel; and
aligning an opposite edge of the elongated elastic member with a corresponding opposite edge of the base panel.

5. The cushion restoration method as claimed in claim 4 comprising the step of:
connecting the elongated elastic member to the base panel in order to form the cushion restoring insert.

6. The cushion restoration method as claimed in claim 1 comprising the step of:
flexing the sitting surface and eliminating the depression by applying a force around a perimeter of the sitting surface, wherein the force is tension created by closing the cushion casing around the deformable member and the cushion restoring insert.

7. The cushion restoration method as claimed in claim 1 comprising the step of:
flexing the base surface and eliminating the elevation by applying a force against the elevation of the sitting surface, wherein the force is tension created by closing the cushion casing around the deformable member and the cushion restoring insert.

8. The cushion restoration method as claimed in claim 1 comprising the step of:
aligning an elongated edge of the base panel to be parallel with an elongated edge of the deformable member.

9. The cushion restoration method as claimed in claim 1, wherein:
a lateral surface of the base panel is pressed against an interior lateral surface of the cushion casing; and
a planar surface of the base panel is congruent with the sitting surface of the deformable member.

10. The cushion restoration method as claimed in claim 1, wherein:
the base portion and the elongated elastic member is made of a foam material.

* * * * *